April 3, 1951 C. D. O'NEAL 2,547,227

PHONOGRAPH PICKUP HAVING A QUADRILATERAL CRYSTAL WITH ONLY ONE CORNER FREE TO FLEX

Filed Nov. 9, 1948

INVENTOR.

CLEON D. O'NEAL

BY

Brown, Denk & Synnestvedt

AGENTS

Patented Apr. 3, 1951 2,547,227

UNITED STATES PATENT OFFICE 2,547,227

PHONOGRAPH PICKUP HAVING A QUADRILATERAL CRYSTAL WITH ONLY ONE CORNER FREE TO FLEX

Cleon D. O'Neal, Glenside, Pa., assignor to Philco Corporation, Philadelphia, Pa., a corporation of Pennsylvania Application November 9, 1948, Serial No. 59,168

5 Claims. (Cl. 179—100.41)

The present invention relates, generally, to transducers of the type employed to reproduce sound from phonograph records. More specifically, the invention pertains to piezo-electric crystal pickups adapted, primarily, although not necessarily, for use with lateral-cut records wherein the sound track takes the form of a spiral groove which is modulated laterally in accordance with the recorded sound.

Recent developments in record making techniques have made possible the commercial production of improved lateral-cut phonograph record discs for home use, which are characterized by their long playing time, compared with the playing time of present day standard records. These improved records, which have become known to the trade as "microgroove" records, are provided with a lateral-cut modulated groove having an exceedingly fine pitch of approximately 224 to 260 lines per inch, and are capable of being satisfactorily played at a slow turntable speed of 33⅓ R. P. M. The combination of this fine pitched groove with this slow turntable speed, has made it possible to achieve a sixfold increase in recording time per disc. In other words, a selection which, for example, normally requires an album of six 12-inch records of the present day standard type, can now be accommodated on a single 12-inch record of the stated improved type.

However, the provision of an adequate economical reproducer for a record of the mentioned improved or microgroove type, meets with unusual technical and manufacturing problems. These problems are particularly in evidence when the provision of a crystal pickup for use with such a record is contemplated. Broadly, the problems involve needle and record wear, and pickup tracking and output difficulties.

The modulated groove of the improved or microgroove record has a width of the order of .003 of an inch, at the surface of the record. The groove is V-cut with a wall angle of about 90° and a bottom radius under .0002 of an inch. In order to obtain satisfactory reproduction with a groove of this size and shape, the needle must have a tip radius of the order of .001 of an inch. Moreover, because of the fineness of the modulated groove, the material employed in the manufacture of the improved record must be soft, as compared with the material utilized in the manufacture of the customary shellac type record, if a clean-cut and undistorted modulated groove is to be obtained. In practice, the improved record is made of suitable plastic material.

The minuteness of the needle, together with the softness of the record material, necessitates operation of the pickup at an exceedingly low needle pressure, so as to prevent unduly rapid wear of the needle and record, as well as to achieve a satisfactory signal-to-noise ratio while maintaining an adequate dynamic range. Experimentation has shown that the needle pressure should be of the order of 5 grams. This low needle pressure, together with the minuteness of the needle and the smallness of the modulated groove, gives rise to tracking difficulties and requires unusual stability and a high order of compliance in the vibratory mechanical system of the crystal pickup, to prevent the needle from jumping out of the groove.

Moreover, because the excursion of modulation is necessarily limited, due to the closeness of the grooves, the force available to drive the crystal is so materially reduced that it becomes a difficult matter to obtain a conventional amount of voltage output which can be used directly from the pickup, without a separate and additional stage of amplification. Also, since response compensation is a process which is accomplished at the expense of losses in voltage, the provision of a generating system having a response characteristic which requires no compensation, entails major problems, especially when the nature of the pickup needle and of the modulated groove tends deleteriously to affect the output of such a system. The main difficulty arises from the fact that the output voltage produced by the crystal is, in part, a function of the force with which the crystal is displaced in response to displacement of the needle as it follows the modulated groove. The provision of a system which forcibly displaces the crystal without exerting, against the record groove, a lateral pressure great enough to mutilate the groove or to cause improper tracking, has been a perpetual source of difficulties, and these difficulties increase as the needle size, the groove width and the record material hardness decrease.

It is, therefore, the primary object of this invention to overcome the above stated difficulties and problems and to make possible the economical production of a piezoelectric crystal pickup which is capable of effectively playing records of the mentioned improved or microgroove type.

Other and more specific objects of the invention have to do with improvements in the mounting and driving structure for the crystal element; in the provision of a compact assembly of elements, so as to facilitate their inclosure in a moistureproof housing; and in the construction and relative disposition of parts to insure stability of certain parts and mechanical compliance of other parts, in order to obtain good reproduction and proper tracking and in order to avoid the deleterious effects of mechanical shocks or the like.

The pickup constructed in accordance with the invention includes a needle having the required minute construction for the proper reproduction of the mentioned improved or microgroove records. The pickup, as a whole, is characterized by its light weight and its ability to track adequately and to operate effectively, at the desired low needle pressure of 5 grams. The invention is especially characterized by a novel mounting and driving arrangement for the piezoelectric crystal unit of the pickup. This arrangement is such that, while the light pressure which is exerted on and by the needle in its side-to-side contact with the modulated narrow groove, is insufficient to injure the groove or to cause mistracking, the force which is developed through contact of the groove with the needle, is great enough to produce an output voltage at least as high as in conventional apparatus so as to insure satisfactory reproduction without inclusion of a compensating network and without the need of a pre-amplifying stage, in the reproducing system.

Other objects and characteristic features, and the manner in which they are obtained, will be fully understood from the following description based on the accompanying drawings in which.

Figures 1, 2, 3, 4, 5:
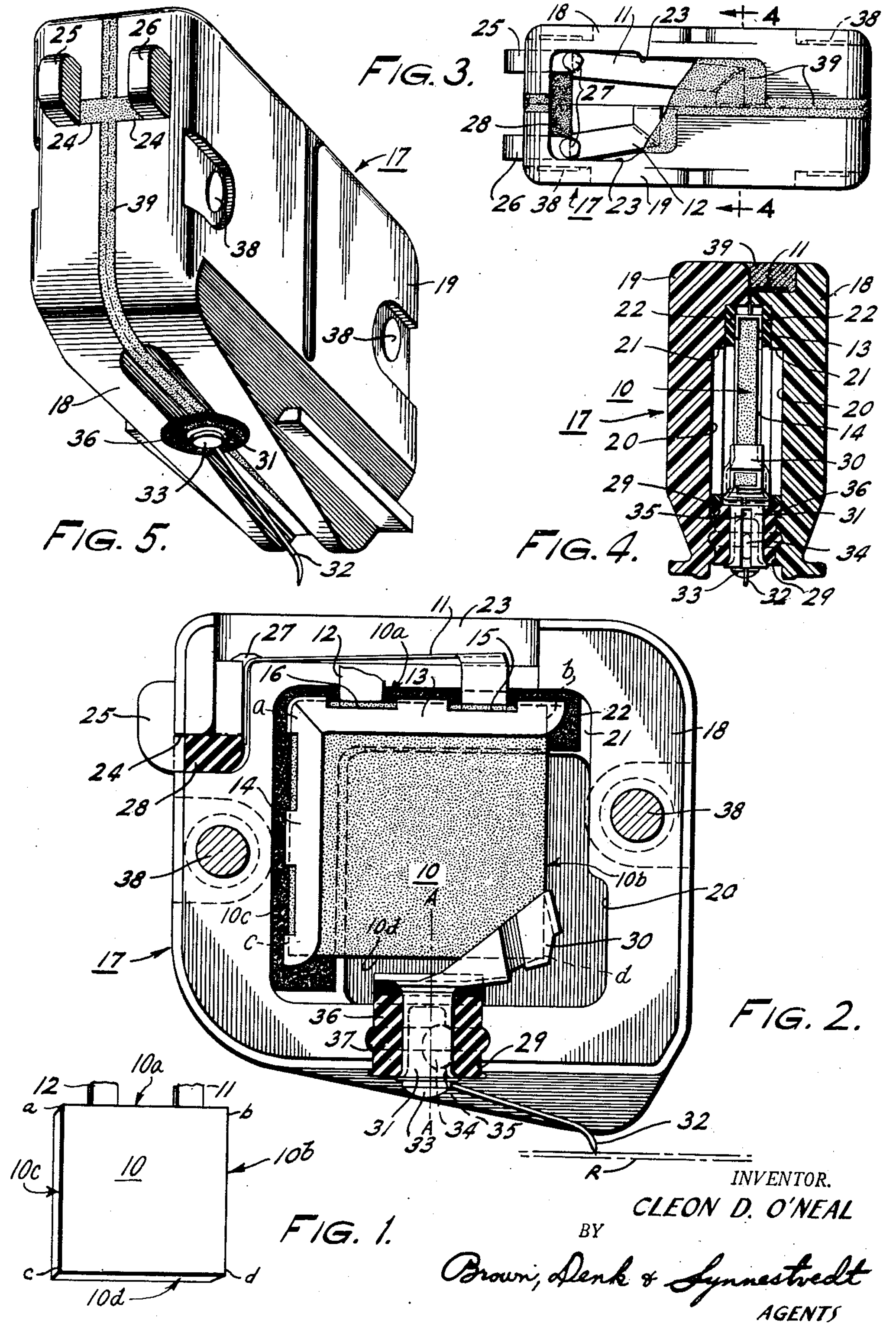
Figure 1 is a perspective view of a piezoelectric crystal unit of the type employed by this invention.
Figure 2 is an enlarged sectional elevational view of one-half of the pickup cartridge, showing the crystal unit and its associated elements arranged in accordance with the invention.
Figure 3 is a plan view, on a different scale, of the assembled pickup cartridge with a portion broken away to clarify the showing of certain parts.
Figure 4 is a sectional view through the height of the pickup cartridge, looking in the general direction of arrows 4—4 of Figure 3.
Figure 5 is an enlarged perspective view of the pickup cartridge.

Referring more particularly to the drawing, the piezoelectric crystal unit is shown, generally, at 10. This unit, as represented in Figure 1, is flat and quadrilateral in shape having four marginal edges 10*a*, 10*b*, 10*c* and 10*d* defining four corner portions *a*, *b*, *c* and *d*. However, in actual use, the crystal unit is much smaller than is shown. As used, the crystal unit measures approximately ⅜ of an inch square and about $\frac{1}{32}$ of an inch thick. The crystal unit has all of its surfaces coated with a waterproofing substance for protection against loss or gain of moisture. In practice, the entire crystal unit, with the exception of its terminal strips 11 and 12, is conveniently dipped in a suitable rubber solution and, then, is allowed to dry until the treated unit can be handled without danger of unduly removing the coating.

The crystal which the invention employs, is of the ordinary Rochelle-salt type and of known "twister" construction including the customary electrodes (not shown) with which the terminal strips 11 and 12 are electrically connected. It is known that when a crystal unit of the kind above mentioned is used in a phonograph pickup and is flexed in response to displacement of the needle as it follows the modulations of the record groove, a voltage is developed between the electrodes, which voltage is made available, through terminal strips 11 and 12, to excite the audio stage of the reproducing system and thus to convert the mechanical displacement of the needle into sound. Normally, in pickups of this character and as hereinbefore indicated, the voltage output is proportional to the needle displacement and is a function of the mechanical force with which the crystal is flexed by displacement of the needle. Since the needle displacement is governed by the amplitude of the recorded modulated groove, it will be appreciated that when playing a record having a narrow laterally-cut groove with small amplitude, such as is the case in the improved or microgroove record, the side-to-side displacement of the needle is small, and because of the low needle pressure with which it is necessary to operate, the force acting on the crystal is likewise small, so that a reduction in voltage output follows. In order to remedy this reduction in output without additional pre-amplification, it is necessary to increase the inherent efficiency of the crystal unit while operating at reduced maximum needle excursion and maintaining the desired low needle pressure. This is accomplished, in accordance with the present invention, by so mounting the unit that only one corner portion (for example, corner portion *d*) of the quadrilateral crystal unit is free to flex, and by associating with said one corner a low inertia vibratory mechanical system particularly devised to drive said one corner with the force required to produce the desired voltage.

Thus, in accordance with the invention, two adjacent marginal edges, 10*a* and 10*c* of the quadrilateral crystal unit are reinforced and supported so as to hold the three corner portions *a*, *b*, and *c* which are included in said edges, against motion, and to leave the remaining two adjacent marginal edges 10*b* and 10*d* and the corner portion *d* therebetween, free to move. By reinforcing and supporting the crystal unit in the manner mentioned, the stresses to which the unit is subjected by movement of the mentioned free corner portion, are amplified and, as a result, the unit is utilized to its fullest extent to produce high voltage output with slight movement of said free corner portion.

In the construction illustrated and as is clearly shown in Figures 2 and 3 of the drawing, two continuous and right angularly disposed marginal edge portions of the crystal unit, including that edge 10*a* from which the terminal strips 11 and 12 extend, are stiffened as by means of a rigid frame consisting of right angularly disposed channeled or U-shaped members 13 and 14. These members snugly embrace said marginal edge portions of the crystal unit, and are advantageously fixed in position by use of a suitable cement applied to the contacting surfaces of said members and crystal unit. At least one channel member 13 is provided with slots as indicated at 15 and 16 (Figure 2) to accommodate the terminal strips 11 and 12, respectively.

The crystal unit with its reinforced marginal edge portions is enclosed and supported within a housing indicated, generally, at 17. This housing comprises complementary half sections 18 and 19 of light-weight non-conducting material. These sections cooperate to clamp the crystal unit along its reinforced portions. As best seen in Figures 2 and 4, the housing sections 18 and 19 are each provided with an inwardly recessed portion 20 of substantially square configuration. These recessed portions are disposed to confront each other when said half sections are assembled to complete the housing, so that a chamber is provided within the housing to accommodate the crystal unit. Also, the housing sections 18 and 19 are each provided with a shelf-like portion 21 which bounds two right angularly disposed sides of the recessed portion of the associated section. These shelf-like portions are likewise disposed to confront each other when the sections of the housing are assembled and, further, are disposed to correspond to the reinforced or stiffened portions of the crystal unit, so as to clamp said portions. Strips 22 of suitable cushioning material, such as rubber, are advantageously interposed between said reinforced portions of the crystal unit and said shelf-like portions of the housing sections to insure retention of the clamped crystal unit and, at the same time, to protect the unit against undue vibrational shocks.

As shown at 23 in Figures 2 and 3, the housing sections are recessed to provide a space for accommodating the terminal strips 11 and 12 and, as shown at 24 in Figures 2 and 5, said sections are slotted to receive contact pieces 25 and 26 which are electrically connected to said strips, the connection being conveniently obtained by soldering, as indicated at 27 (Figure 2). A part of each of said contact pieces is exposed outwardly of the assembled housing, through the associated slot, for engagement with suitable corresponding contact members which are conveniently provided in the customary tone-arm (not shown) to transmit the voltage from the pickup to the audio stage of the reducing system. The contact pieces 25 and 26 are advantageously located in position within their respective slots by means of a block 28 (Figures 1 and 2) of insulating material, which block fits in said slots and extends between said pieces. As appears in Figures 2, 4 and 5, the housing sections 18 and 19 are further provided with hollowed-out portions which, when said sections are assembled, cooperate to form a generally circular opening 29 for the purpose presently described.

The above mentioned low inertia vibratory mechanical system, in accordance with the invention, takes the form of a leverage arrangement, one arm of which is constituted by the needle, the other arm of which is constituted by a driving chuck in engagement with the free corner portion *d* of the crystal unit, and the fulcrum of which is provided by parts of the crystal housing. In practice, the relationship between the length of the respective lever arms is such that the slight force exerted at the tip portion of the needle (one lever arm) is amplified at the crystal-engaging portion of the chuck (other lever arm) so that the force exerted at the free corner portion of the crystal is great enough to create, within the crystal, stresses of ample magnitude to produce the desired voltage output. Also in accordance with the invention, the two lever arms (the needle and the driving chuck) are associated in such a manner as to form a reversely bent crank-like leverage assembly, the rotational axis A—A (see Figure 2) of which is generally perpendicular to the free edge 10*d* of the crystal unit and is disposed substantially midway between the free corner portion *d* and the clamped corner portion *c* of said edge 10*d*.

As shown in Figure 2, when the pickup cartridge is in operative position, with the needle in engagement with a record R, the mentioned one free edge 10*d* of the crystal unit becomes located in substantially confronting relation with respect to the playing surface of the record, and the rotational axis A—A of the leverage assembly extends generally in a plane perpendicular to said free edge 10*d* of the unit and to said surface of the record. In this manner, the crystal unit and the leverage assembly, when in operative engagement with the record, cooperate to provide a well balanced arrangement which is most desirable for good performance of the pickup. Also, the manner of mounting the crystal unit and the crank-like leverage arrangement of the vibratory mechanical system makes it possible to provide a good seal between adjacent portions of the housing and leverage arrangment at the point where said arrangement passes through the housing, since the movement at said point is generally rotational about an axis concentrically disposed with respect to said portions.

In the embodiment illustrated and as can best be seen in Figure 2, the driving chuck is of substantially L-shaped configuration and includes a crystal-engaging portion 30 and a needle-receiving portion 31. The crystal-engaging portion of the driving chuck clampingly embraces the free corner portion of the crystal unit. Suitable cement is advantageously applied to the contacting faces of said corner portion of the crystal unit and to said crystal-engaging portion of the driving chuck, to insure retention of said chuck in its operative position. The needle-receiving portion of the driving chuck is substantially tubular in shape, and extends from the crystal-engaging portion to pass through opening 29 in the crystal housing. It will be noted that the opening 29 and the chuck portion lie in an extension of the plane of the supported crystal unit and are located approximately midway of the length of the free edge 10*d* of said unit.

The needle consists of a piece of wire 32 which is conveniently secured to and projects laterally from a shank 33. This shank is substantially cylindrical and snugly fits in the tubular portion 31 of the driving chuck, so that the needle extends back in the direction of the crystal-engaging portion 30 of said chuck. By associating the chuck and needle in this manner, the chuck and needle cooperate to form the reversely bent crank-like assembly above referred to. In order to facilitate and to insure the desired positioning of the needle with respect to the crystal unit and its driving chuck, a slot-and-key arrangement is provided between said chuck and the needle shank. In the arrangement shown, a key 34 is arranged on and projects laterally from the needle shank for slidable engagement within slot 35 provided longitudinally of the shank-receiving portion 31 of the driving chuck. The relative disposition of slot 35, key 34 and needle-forming wire 32, is such that the needle can assume only that position which locates it in the mentioned relationship with respect to the crystal and driving chuck. The arrangement above described has the advantage that a damaged needle can be readily removed for repair or replacement, without disturbing the pickup cartridge assembly.

The tubular portion 31 of the driving chuck is movably anchored in opening 29 of the housing by means of a bushing 36 of resilient material such as soft rubber. This bushing seals the opening about said tubular portion and yet allows displacement of the chuck to actuate the crystal unit in response to lateral movement of the needle when tracking in the modulated groove of the record. The wall defining the opening 29 is inwardly recessed as shown at 37 in Figure 2, so as to provide an annular depression into which part of the bushing enters when said bushing is pressed by clamping action of the housing sections upon being tightly drawn together, as by means of fastening elements 38. In this manner, the bushing is positively held in position, and the sealing between the adjacent wall surfaces of the housing and tubular portion of the chuck is enhanced. Furthermore, the cooperative association of the housing wall at opening 29, of the bushing 36 and of the tubular portion 31 provides the fulcrum for the operation of the leverage arrangement in the manner above explained.

In order to establish a complete seal all around the assembled housing, the space 23 accommodating terminal strips 11 and 12, the open portion of slots 24 receiving the contact pieces 25 and 26, and the space along the contacting edges of housing sections 18 and 19 are filled, as represented at 39, with a suitable compound such as sealing wax.

From the foregoing description, it will be appreciated that the invention provides a compact and adequately sealed crystal pickup cartridge which is of light construction suitable for use in the playing of records which require operation at exceedingly low needle pressure. Particularly, it will be recognized that the arrangement which the invention provides for the mounting and driving of the crystal unit, results in the obtainment of a piezoelectric pickup which is capable of good voltage output and has good response characteristics when operating at a low needle pressure and with a fine extremely narrow modulated groove such as is provided on the herein mentioned improved or microgroove records.

I claim:

1. In a transducer for reproducing sound from a phonograph record, a flat quadrilateral piezoelectric crystal unit having corner portions, means clamping said unit along two adjacent edges so as to prevent flexure of the three corner portions included in said two edges and to leave one corner portion between the remaining two adjacent edges free to flex, said means further supporting said unit so as to locate one of said remaining two edges in substantially confronting relation with respect to the playing surface of a record when the transducer is in use, and means including a driving chuck and a reproducing needle, said chuck being connected with the free corner portion of the crystal unit to drive the same and cooperating with the needle to provide a crank-like leverage system, the pivotal axis of which is disposed generally in a plane perpendicular to said one confronting edge and passes substantially midway between the free corner portion and the clamped corner portion of said one confronting edge.

2. A transducer as set forth in claim 1, in which the driving chuck includes a crystal-engaging portion and a needle-receiving portion, said crystal-engaging portion clampingly embracing the free corner portion of the crystal unit, and the needle-receiving portion providing the pivot for the crank-like leverage system.

3. A transducer as set forth in claim 2, in which the crystal-engaging portion, the needle-receiving portion and the needle received therein are relatively disposed to constitute a reversely bent crank-like leverage system.

4. A transducer for reproducing sound from a phonograph record, comprising in combination with a flat four-cornered piezoelectric crystal unit, a housing enclosing said unit and having portions cooperating to hold the crystal unit so as to prevent flexure of three adjacent corners of said unit and so as to locate one edge only of the unit in substantially confronting relation with respect to the playing surface of a record when the transducer is in use, and a leverage system including a record-engaging needle and a driving chuck connected with the fourth and free corner of said unit to drive the same, said leverage system being mounted in the housing for pivotal movement about an axis passing perpendicularly through said one confronting edge and lying in the plane of said unit, the mentioned driving chuck including a needle-receiving portion, said needle-receiving portion cooperating with adjacent parts of the housing to provide the fulcrum for the leverage system.

5. A transducer as set forth in claim 4, in which a rubber-like bushing is pressingly engaged between the needle-receiving portion of the chuck and adjacent parts of the housing, said bushing providing a tight seal at the fulcrum of the leverage system.

CLEON D. O'NEAL.

REFERENCES CITED

The following references are of record in the file of this patent:

UNITED STATES PATENTS

| Number | Name | Date |
|---|---|---|
| 2,105,011 | Williams | Jan. 11, 1938 |
| 2,181,437 | Norton | Nov. 28, 1939 |
| 2,207,539 | Gravley | July 9, 1940 |
| 2,222,056 | Williams | Nov. 19, 1940 |
| 2,286,178 | Kornei | June 9, 1942 |
| 2,305,369 | Williams | Dec. 15, 1942 |
| 2,320,416 | Dally | June 1, 1943 |
| 2,363,497 | Begun | Nov. 28, 1944 |